United States Patent [19]

Danzy

[11] Patent Number: 4,848,729
[45] Date of Patent: Jul. 18, 1989

[54] VALVE SEAL

[75] Inventor: Roger D. Danzy, Pineville, La.

[73] Assignee: Dresser Industries, Inc., Dallas, Tex.

[21] Appl. No.: 151,293

[22] Filed: Feb. 1, 1988

[51] Int. Cl.$^4$ ............................................. F16K 1/46
[52] U.S. Cl. ................................... 251/332; 251/334
[58] Field of Search ................ 251/334, 358, 333, 332

[56] References Cited

U.S. PATENT DOCUMENTS

| | | |
|---|---|---|
| 1,449,876 | 3/1923 | Williams ........................ 251/334 X |
| 2,907,548 | 10/1959 | Maas et al. . |
| 3,828,810 | 8/1974 | Evers et al. . |
| 4,037,819 | 7/1977 | Kindersley . |
| 4,272,054 | 6/1981 | Zinnai . |
| 4,277,047 | 7/1981 | Zinnai . |
| 4,290,614 | 9/1981 | Moll . |
| 4,293,116 | 10/1981 | Hinrichs . |
| 4,296,915 | 10/1981 | Baumann . |
| 4,477,057 | 10/1984 | Friess . |

*Primary Examiner*—Arnold Rosenthal

[57] ABSTRACT

An improved valve seal is provided which utilizes a c-shaped secondary seal. The c-shaped seal is positioned between the valve disc and the valve seat. A retainer locates the c-shaped seal with respect to the disc, retains the seal against the disc and provides a pre-load on the seal as required.

10 Claims, 2 Drawing Sheets

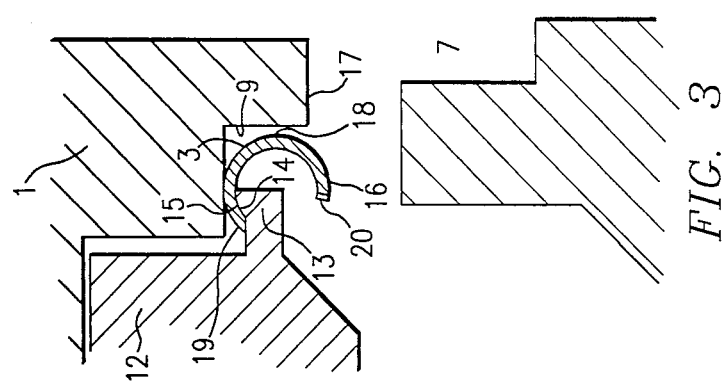
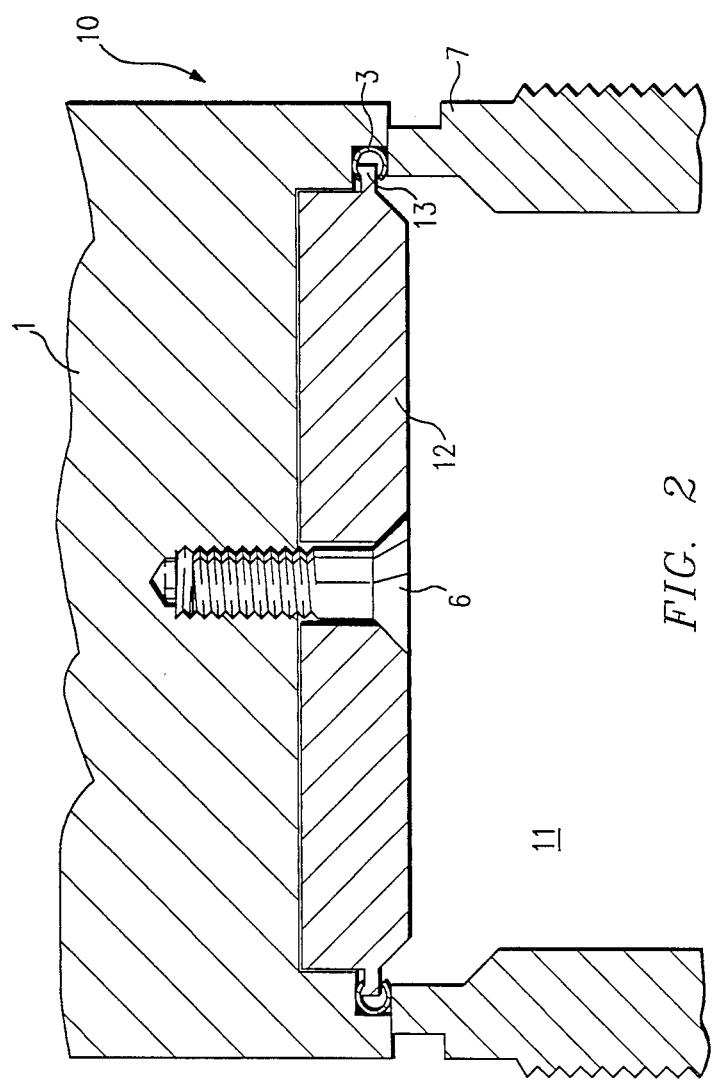

VALVE SEAL

TECHNICAL FIELD

This invention relates to valve seals, and more particularly to an improved valve seal which is adapted to high temperature, high pressure operation and corrosive environments.

BACKGROUND OF THE INVENTION

The present invention is concerned with the problem of providing a suitable high temperature, high pressure, valve seal.

OBJECTS OF THE INVENTION

1. To provide improved line valves, control valves, safety valves, safety relief valves and relief valves.
2. To provide an improved valve seal which is flexible and replaceable.
3. To provide an improved valve seal which is easily aligned and yet easily secured against the effects of flow induced vibration.
4. To provide an improved valve seal which may be pre-loaded to promote better sealing.
5. To provide an improved valve seal which is less susceptible to errosion due to the flow of fluid within the valve.

SUMMARY OF THE INVENTION

The objects of the present invention are achieved by providing an improved valve seal assembly, the assembly comprising a valve disc having a raised lip which is adapted to contact the valve seat forming the primary seal, but also forming a groove into which a c-shaped seal is inserted. A retainer having either an integral flange or retainer washer holds the c-shaped seal against the disc. When the disc is closed against the seat, the c-shaped seal contacts the disc, the interior face of the lip and the seat, thereby forming an effective secondary seal.

BRIEF DESCRIPTION OF THE DRAWINGS

FIG. 2 shows in cross-section an alternate embodiment of the present invention.

FIG. 3 shows in cross-section an enlarged view of the integral flange and seal of the invention depicted in FIG. 2.

DESCRIPTION OF THE PREFERRED EMBODIMENTS

Figure 1:
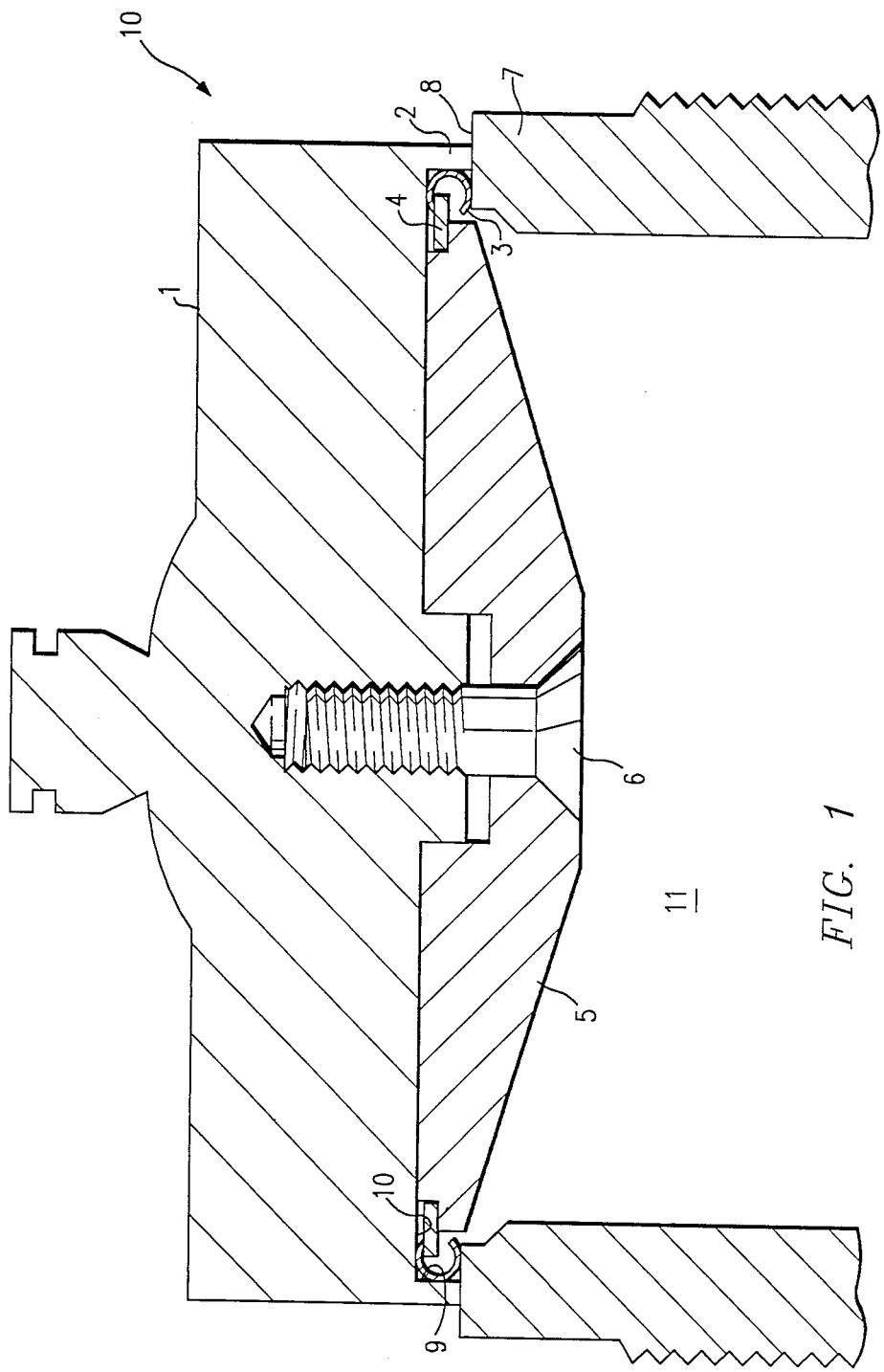
FIG. 1 shows in cross-section the preferred embodiment of the improved seal of the present invention.

In the improved seal structure 10, as seen in FIG. 1, a valve disc 1 has a raised lip 2. Interior to the lip, a metallic c-shaped perimetral seal 3 is retained by a flat washer 4.

The c-shaped seal comprises a slotted tube. The slot is continuous and follows or circumscribes the inner periphery of the ring or annulus of the seal. The slot forms a gap in the seal which in cross section contributes to the appearance of a "c". The slot also contributes to the resiliency of the seal as can be appreciated from a comparison of the seal configurations FIGS. 2 and 3. The washer is held in place by a retainer 5. The retainer is removably attached to the disc 1 by a retainer screw 6. When the seal is installed and retained by the washer and is seated against the seal set 7, as shown in FIG. 1, the c-shaped seal contacts the top of the seat 8, the interior wall of the lip 9, and the bottom of the disc 10. Primary sealing action is provided by the contact between the lip 2 and top of the seat 8. Secondary sealing is provided by the action of the c-shaped metallic seal 3 against the top of the seat 8 in the interior face of the lip 9, and the bottom of the disc 10. Increasing pressure within the valve chamber 11 acts to increase the contact pressure of the seal 3 against the aforementioned areas of contact, thereby improving the sealing ability of the device at elevated pressures.

In an alternate embodiment, an integral flange positions the seal relative to the seat. This arrangement is shown in FIGS. 2 and 3. In FIG. 2, it can be seen that in the assembled position, the c-shaped metallic seal 3 is positioned by a retainer 12, having an integral flange 13. As seen in FIG. 3, the integral flange has a rim 14 which is adapted to match the interior conformation of the seal 3, thus the contact surface of the flange 15 with the seal is a section of a torus (approximately one quarter).

As seen in FIG. 3, the disc 1 may be raised from the seat 7, thus unseating the seal 3, which is shown in the relaxed state. In the relaxed state, the bottom of the seal 16 extends below the level of the bottom of the lip 17, just as the side of the seal 18 retracts slightly from the interior wall of the lip 9. Note that the top edge of the seal 19 is located radially inward of the bottom edge 20. This facilitates insertion of the flange 13.

In practice, various metals can be used to provide interchangeable seals to suit varying service conditions. By changing the geometry of the integral flange or washer, the pre-load on the seal may be varied.

While we have described above the principles of the invention in connection with specific equipment, it is to be understood that this description is made only by way of example and not as a limitation to the scope of the invention as set forth in the objects thereof and in the accompanying claims.

I claim:

1. In a valve seal, the improvement comprising:
   a valve disc having a raised lip;
   a resilient annular seal, c-shaped in cross section, lying interior to the lip;
   a washer adapted to retain the annular seal, the washer having a portion located within the annular seal and adapted to clamp a portion of the annular seal between the washer and the disc;
   a retainer having a top face adapted to contact the disc, and a perimetral shoulder adapted to retain and position the washer with respect to the disc; and
   a seat adapted to compress the annular seal between the seat and the disc and to contact the lip thereby forming a second seal.

2. In a valve seal, the improvement comprising:
   a valve disc having a raised lip, the lip having an interior face;
   a resilient annular seal, c-shaped in cross section, the annular seal having an interior region, a curved sealing surface, a top edge and a bottom edge;
   a retainer having a top face adapted to contact the disc, and an integral flange, the flange adapted to sit partially within the interior region of the annular seal and retain the annular seal against the disc; and
   a seat adapted to compress the annular seal between the seat and the disc and to contact the lip thereby forming a second seal.

3. In a valve seal, the improvement comprising:
a disc having a raised lip, the lip having an interior face;
a seat adapted to contact the lip;
the disc having an open position and a closed position;
the disc, lip and seat forming a groove when the disc is in the closed position;
a resilient c-shaped seal lying within the groove;
a retainer, said retainer lying partially within the cshaped seal whereby in the closed or compressed position, the c-shaped seal contacts the disc, the interior face of the lip and the seat; and in the open or relaxed position the seal contacts the disc but not the interior face of the lip or the seat.

4. The improved valve seal of claim 2, wherein:
the integral flange further comprises a rim, the rim contacting an interior region of the seal in conformation thereto.

5. In a valve having a sealable interior portion, the improvement comprising:
a closure comprising a raised lip and a retainer radially inward of the raised lip;
a resilient annular seal comprising a slotted tube, the slot circumscribing an inner periphery of the seal;
the retainer having a reduced circumferential rim which is inserted into and surrounded by the slot; and
a valve seat sealing engageable with the raised lip and forming, when sealed by the raised lip, a circumferential groove about the interior of the valve, the groove adapted to receive the annular seal in compression between the closure and the seat.

6. The improved valve of claim 5, wherein: the retainer is integral with the closure.

7. The improved valve of claim 6, wherein: the rim is integral with the retainer.

8. The improved valve of claim 7, wherein:
the rim includes an enlarged periphery conforming to an interior portion of the annular seal.

9. The improved valve of claim 5, wherein:
the retainer is removably fastened to the closure.

10. The improved valve of claim 9, wherein:
the reduced circumferential rim is a washer carried by the retainer.

* * * * *